United States Patent [19]

Kazusa et al.

[11] Patent Number: 4,570,689
[45] Date of Patent: Feb. 18, 1986

[54] BICYCLE TIRE TREAD

[75] Inventors: Susumu Kazusa; Harunori Okamoto; Eiji Fukuchi, all of Kagawa, Japan

[73] Assignee: Mitsuboshi Belting Ltd., Kobe, Japan

[21] Appl. No.: 591,432

[22] Filed: Mar. 20, 1984

[30] Foreign Application Priority Data

Oct. 21, 1983 [JP] Japan .................. 58-163804[U]

[51] Int. Cl.⁴ .............................................. B60C 11/06
[52] U.S. Cl. ........................ 152/209 R; 152/209 NT; 152/DIG. 1; D12/142
[58] Field of Search ........... 152/209 R, 209 A, 209 B, 152/209 NT, 209 WT, 209 D, DIG. 1; D12/141, 142, 143

[56] References Cited

U.S. PATENT DOCUMENTS

D. 72,240  3/1927  Sears ................................ D12/141
D. 250,106 10/1978 Candiliotis ........................ D12/143
B 510,184  4/1976  Newman .......................... D12/143
1,835,639 12/1931  Dolding .......................... 152/209 R
4,278,121  7/1981  McDonald ...................... 152/209 R Primary Examiner—Lois E. Boland
Attorney, Agent, or Firm—Wood, Dalton, Phillips, Mason & Rowe

[57] ABSTRACT

A bicycle tire which has a raised, circumferential center rib and laterally opening grooves of scalene trapezoidal shape alternatively in the right and left sides of the center rib whereby the center rib defines a zigzag shape. Groups of polygonal, raised blocks are spaced from both sides of said center rib along the entire periphery of the tire. The bicycle tire provides an improved ride on level and uneven ground or roadways. The tire provides the advantages of both line and block pattern tread types in a single overall tread design.

21 Claims, 5 Drawing Figures

BICYCLE TIRE TREAD

DESCRIPTION

1. Technical Field

This invention relates to bicycle tires and in particular to tread designs for bicycle tires used on a wide range of terrains.

2. Background Art

It has been conventional to provide two different forms of tread designs for bicycle tires depending on the intended use thereof. Where the bicycle tire is intended for use on uneven ground or roadways, it has been conventional to provide a tread design utilizing spaced blocks in different patterns. Where the bicycle tire is intended for use on smooth or leveled ground or roadways, it has been conventional to provide a tread design utilizing primarily a line configuration in combination with a smaller block pattern.

The use of patterns having spaced blocks on smooth surfaces presents the problem of reduced contact between the tire and the ground or road surface because of the wide gaps between the spaced blocks. Such tires have large running resistances and further cause an uncomfortable ride. Further, as a reduced area of contact is provided between the tire and the ground or roadway, the reduced frictional force causes slipping and difficulty of control, making such block-type tires generally undesirable for use on such smooth surfaces.

Reversely, where a line pattern tire is used on uneven surfaces, such as ground or roadways, which further may be muddy or sandy, the line pattern provides only limited contact with spaced portions of the surface so that a weak driving force is exerted by the cyclist thereon and further difficulty in control of the bicycle results.

Resultingly, it has been conventional to design tires primarily for use on either of the different types of running surfaces. This has a serious disadvantage in that the type of terrain may vary widely and, thus, such tires are quite often unsuited for the terrain at a given time, even though they may be well-adapted for the terrain at other times during the use of the bicycle.

DISCLOSURE OF THE INVENTION

The present invention comprehends a bicycle tire construction having an improved tread design which eliminates the disadvantages of the prior art designs discussed above in a novel and simple manner.

More specifically, the present invention comprehends the use of a wide line-type central rib having alternating outwardly opening grooves at the opposite right and left side edges thereof so as to cause the center rib to define an effective zigzag shape, with a continuous center portion extending circumferentially about the tire. The tread design further includes polygonal raised blocks spaced from both sides of the rib along the entire extent of the tire.

The present tire has been found to provide excellent characteristics on both smooth and uneven terrains, thereby providing improved control and safety in the use of the bicycle, as well as an improved, comfortable ride.

The tire construction is extremely simple and economical, while yet providing these highly desirable advantages.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
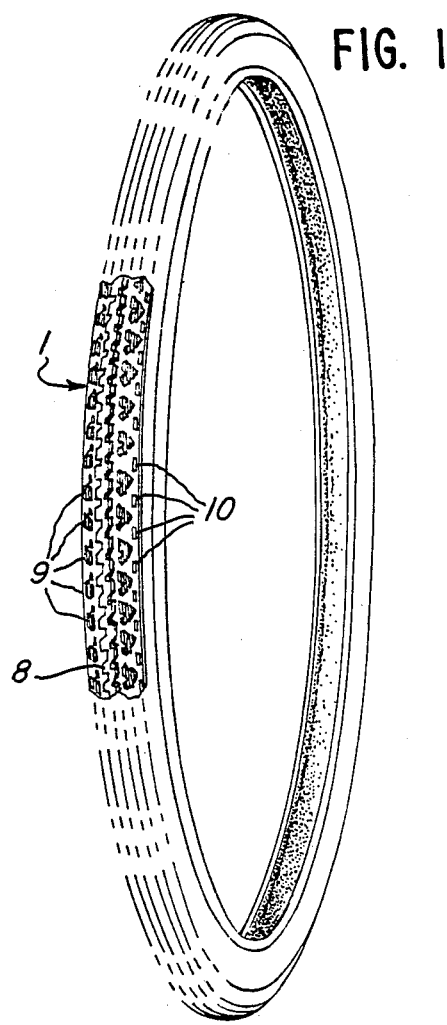
FIG. 1 is a perspective view of a bicycle tire embodying the invention showing the circumferential extent of the tire tread in broken lines.

In the illustrative embodiment of the invention as disclosed in the drawing, a bicycle tire generally designated 1 is provided with a new and improved tread design 7 on the carcass 2 of the tire. The carcass includes beads 4 in which wires 3 are embedded at the opposite spaced edges of the carcass. The tire is adapted to enclose a conventional inner tube 5 with the beads 4 being engaged with suitable complementary gripping portions of a conventional bicycle tire rim 6.

Figure 4:
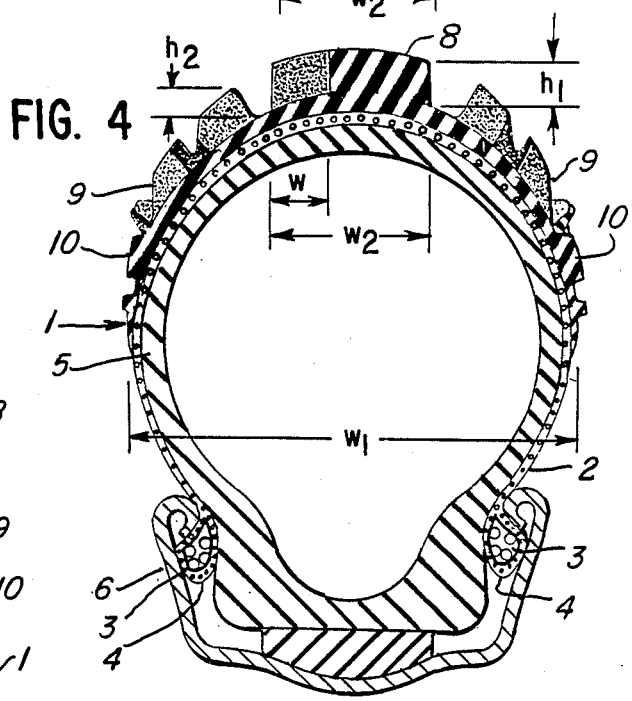
FIG. 4 is a transverse section thereof taken substantially along the line 4—4 of FIG. 3 and further illustrating the mounting of the tire on a tire rim.

Tread design 7 includes a relatively wide circumferential center rib 8 extending about the annular extent of the tire. A plurality of raised blocks 9 are provided at opposite sides of the center rib. As shown, the blocks are of generally C-shaped configuration opening toward the central rib and are spaced circumferentially about the tire. In addition, a plurality of trapezoidal blocks 10 are provided intermediate the spaced blocks 9 and outwardly thereof so as to be substantially at the sidewall of the tire, as best seen in FIG. 4.

Figure 2:
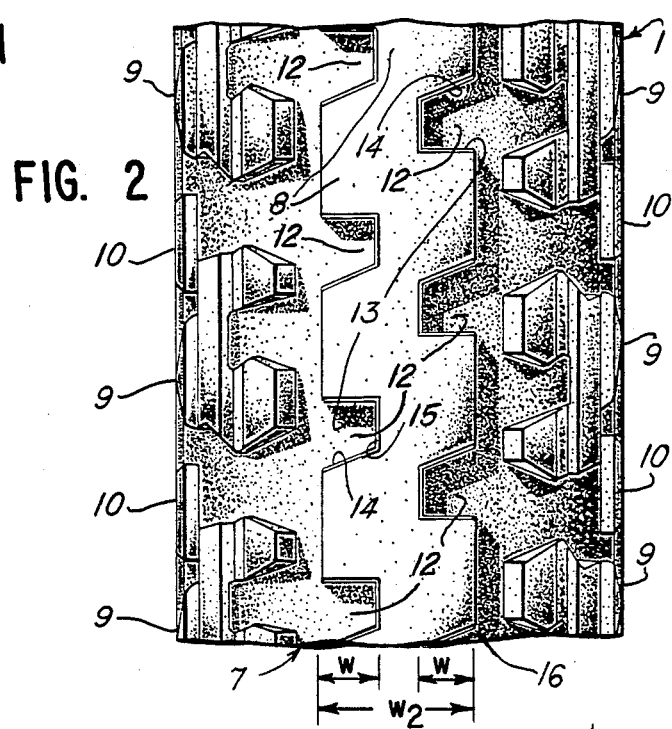
FIG. 2 is a fragmentary enlarged plan view of the tire tread design of the invention.

The continuous annular central rib 8 is provided with an alternating series of outwardly opening scalene trapezoidal grooves 12 so as to cause the central rib to define a generally zigzag shape, as best seen in FIG. 2.

As best seen in FIG. 2, each of the grooves is defined by a first planar edge surface 13 extending perpendicularly to the circumferential extent of the rib 8, and an opposite, second planar edge surface 14 extending at an angle to the circumferential extent of the rib 8. The inner, or bottom, surface 15 of each rib extends parallel to the circumferential extent of rib 8, whereby the cooperating surfaces 13, 14 and 15 define the aforementioned scalene trapezoidal configuration. The lands 16 between said grooves on opposite side portions of said center rib define parallel annuli interrupted by said grooves and extending parallel to an annular midportion of said rib.

As further illustrated in FIG. 2, the relationship of the surfaces 13 and 14 are reversed as between the grooves on opposite sides of the rib 8. Thus, as shown in FIG. 2, the grooves on the left side of rib 8 are arranged with the perpendicular surfaces 13 at the uppermost portion of the groove, whereas the grooves on the right side are arranged with the perpendicular surfaces 13 at the lowermost edge of the groove.

As further illustrated in FIG. 2, in the illustrated embodiment, the C-shaped blocks 9 open towards the rib 8 sequentially alternatively toward the grooves 12 and the lands 16 between the grooves, so that both the grooves 12 and the C-shaped ribs 8 are disaligned transversely across the tread design. The blocks 10, however, as best seen in FIG. 3, are aligned with the spaces between the ribs 9 throughout the entire circumferential extent of the tire.

Figure 3:
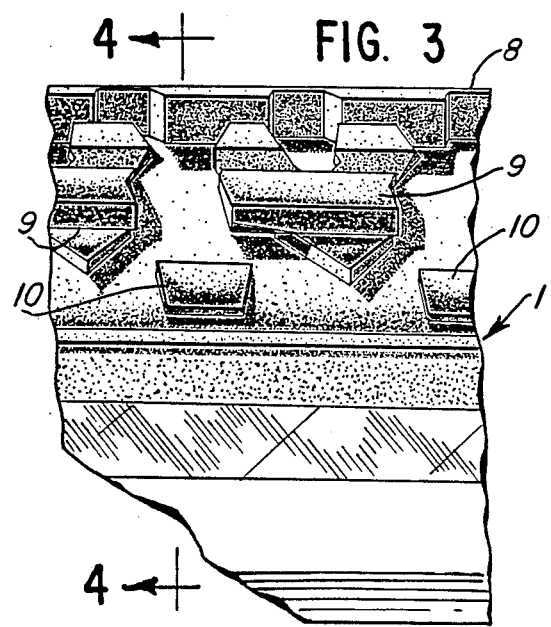
FIG. 3 is a fragmentary enlarged side elevation thereof.

As further shown in FIG. 3, the trapezoidal blocks 10 narrow outwardly from the center rib toward the sidewall of the tire.

As seen in FIG. 4, in a preferred embodiment, the dimensional ratio of the height $h_1$ of center rib 8 to the height $h_2$ of the blocks 9 as measured radially of the annular extent of the entire tire should be greater than 1.0.

Further in the preferred embodiment, the width $W_2$ of the center rib 8 should be within the range of approximately 20 to 40% of the width $W_1$ of the inflated tire.

Still further in the preferred embodiment, the maximum depth w of the grooves 12 relative to the width $W_2$ of the rib 8 should satisfy the formula:

$$(\tfrac{1}{4})W_2 < w \leq (\tfrac{1}{2})W_2$$

Further in the preferred embodiment, the relationship between the maximum width a of the bottom of the grooves 12 and the depth w of the grooves should satisfy the formula:

$$(\tfrac{2}{3})w < a < 2w.$$

Figure 5:
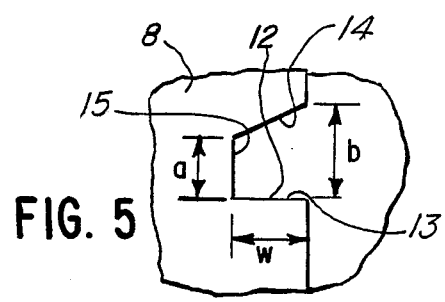
FIG. 5 is a diagrammatic showing of the trapezoidal grooves in the center rib.

In the preferred embodiment, as seen in FIG. 5, the width b of the grooves at the outer, wide end thereof would have a relationship to the width a of the grooves at the inner end thereof to satisfy the formula:

$$b/a = 1.1 \text{ to } 2.0.$$

INDUSTRIAL APPLICABILITY

Bicycle tires utilizing the preferred embodiment of the tread design disclosed above have been found to provide substantially improved riding and traction characteristics with reduced running resistance. Thus, the tread design of the present invention provides a bicycle tire adapted for use over a wide range of terrains of both even and uneven characteristics.

Illustratively, when the tire is utilized on smooth terrain, with the load transmitted through the tire being supported primarily by the center rib, the ground-contacting area is reduced so as to effectively minimize friction between the tire and the terrain, thereby minimizing running resistance. However, if the width $W_2$ of the center rib is made to be less than approximately 20% of the width $W_1$ of the tire, instability of the tire results. A smaller width $W_2$ permits the rib inwardly of the grooves 12 to deflect during running and, thus, cause deterioration in the stability.

Reversely, if the width $W_2$ is made to be greater than approximately 40% of the width $W_1$ of the tire, undesirable increase in the running resistance of the tire results.

Further, if the relationship of the rib width $W_2$ and groove depth w does not satisfy the formula $(\tfrac{1}{4})W_2 < w < (\tfrac{1}{2})W_2$, rib 8 has insufficient stiffness and stability so as to become deformable during operation of the bicycle, thereby again causing deterioration of the ride and drive force between the tire and the terrain surface.

Again, if the formula $(\tfrac{2}{3})w < a < 2w$ is not satisfied, the groove configuration causes increased friction between the decreased areas of terrain contact, thereby causing rapid, undesirable wear of the tire on smooth terrains, such as asphalt roads and the like.

If the formula $b/a = 1.1$ to 2.0 is not satisfied, clogging of the grooves 12 may occur when the tire is run on uneven terrain, such as where soil or mud are present. Such clogging resultantly causes deterioration in the driving characteristics of the tire. By maintaining the configuration within the formula $b/a = 1.1$ to 2.0, self-elimination of the soil and mud is effected, providing improved operating characteristics of the tire over such terrain.

If the ratio $b/a$ is smaller than 1.1, it has been found that deterioration in the self-cleaning of the grooves of soil or mud occurs, and if the ratio $b/a$ is greater than approximately 2.0, while the soil and mud eliminating effect is provided, the drive force between the tire and the terrain is undesirably reduced.

By arranging the zigzag pattern of the grooves 12 as described above and as shown in FIG. 2, an improved driving relationship between the tire and different forms of subjacent terrain is obtained.

In the illustrated embodiment, because of the reverse arrangement and location of grooves 12 on opposite sides of the rib 8, the angled end surfaces 14 may be seen to be in alignment transversely of the tire, whereas the perpendicular surfaces 13 are offset in the line with the center of the opposite lands 16.

In the illustrated embodiment, it is preferable that the inflated tire 1 have a width $W_1$ greater than 30 mm. when the tire is to be used on an uneven terrain so as to obtain optimum results from the improved tread design.

Thus, the invention comprehends an improved tire tread design which provides improved, comfortable and sage riding characteristics both on smooth terrains and on uneven terrains as a result of the unique arrangement of rib 8 with grooves 12 provided at opposite sides thereof in the manner discussed above. The tire provides low resistance and high traction characteristics on smooth roads, while providing improved gripping engagement with uneven terrains and a self-cleaning functioning relative to mud, soil, sand, etc., encountered commonly in uneven terrains. Thus, the single tread design is advantageously adapted for use of the tire on a wide range of smooth and uneven terrains while providing improved riding and safety characteristics to the cyclist.

The foregoing disclosure of specific embodiments is illustrative of the broad inventive concepts comprehended by the invention.

We claim:

1. In a bicycle tire, an improved tread design comprising:
    an annular bicycle tire carcass;
    an annular, raised center rib extending concentrically about said carcass and being provided with outwardly opening, transversely disaligned scalene trapezoidal grooves in the right and left sides of said center rib whereby the center rib defines a zigzag shape with a continuously annular midportion, the lands between said grooves on both the right and left sides of said center rib defining parallel annuli interrupted by said grooves and extending parallel to said annular midportion; and
    raised blocks spaced from both sides of said center rib along the entire longitudinal periphery of said bicycle tire.

2. The bicycle tire of claim 1 wherein said scalene trapezoidal grooves at one side of the rib are oppositely arranged relative to the grooves on the other side of the rib.

3. The bicycle tire of claim 1 wherein the dimensional ratio of the height of said center rib to the height of said blocks is equal to or greater than 1.0.

4. The bicycle tire of claim 2 wherein the dimensional ratio of the height of said center rib to the height of said blocks is equal to or greater than 1.0.

5. The bicycle tire of claim 1 wherein the relationship of the width of said center rib, the depth of said grooves, the width of the outer end of the grooves, and the width of the inner end of the grooves is $(\frac{1}{4})W_2 < w < (\frac{1}{2})W_21$, $(\frac{2}{3})w < a < 2w$ and $b/a = 1.1$ to $2.0$ where $W_2$ is the width of the rib, w is the depth of the grooves, a is the width of the grooves at the inner end thereof, and b is the width of the grooves at the outer end thereof.

6. The bicycle tire of claim 2 wherein the relationship of the width of said center rib, the depth of said grooves, the width of the outer end of the grooves, and the width of the inner end of the grooves is $(\frac{1}{4})W_2 < w < (\frac{1}{2})W_21$, $(\frac{2}{3})w < a < 2w$ and $b/a = 1.1$ to $2.0$ where $W_2$ is the width of the rib, w is the depth of the grooves, a is the width of the grooves at the inner end thereof, and b is the width of the grooves at the outer end thereof.

7. The bicycle tire of claim 3 wherein the relationship of the width of said center rib, the depth of said grooves, the width of the outer end of the grooves, and the width of the inner end of the grooves is $(\frac{1}{4})W_2 < w < (\frac{1}{2})W_21$, $(\frac{2}{3})w < a < 2w$ and $b/a = 1.1$ to $2.0$ where $W_2$ is the width of the rib, w is the depth of the grooves, a is the width of the grooves at the inner end thereof, and b is the width of the grooves at the outer end thereof.

8. The bicycle tire of claim 4 wherein the relationship of the width of said center rib, the depth of said grooves, the width of the outer end of the grooves, and the width of the inner end of the grooves is $(\frac{1}{4})W_2 < w < (\frac{1}{2})W_21$, $(\frac{2}{3})w < a < 2w$ and $b/a = 1.1$ to $2.0$ where $W_2$ is the width of the rib, w is the depth of the grooves, a is the width of the grooves at the inner end thereof, and b is the width of the grooves at the outer end thereof.

9. The bicycle tire of claim 1 wherein the width of said center rib is within a range of approximately 20 to 40% of the width of the inflated tire.

10. The bicycle tire of claim 2 wherein the width of said center rib is within a range of approximately 20 to 40% of the width of the inflated tire.

11. The bicycle tire of claim 3 wherein the width of said center rib is within the range of approximately 20 to 40% of the width of the inflated tire.

12. The bicycle tire of claim 4 wherein the width of said center rib is within the range of approximately 20 to 40% of the width of the inflated tire.

13. The bicycle tire of claim 5 wherein the width of said center rib is within the range of approximately 20 to 40% of the width of the inflated tire.

14. The bicycle tire of claim 6 wherein the width of said center rib is within the range of approximately 20 to 40% of the width of the inflated tire.

15. The bicycle tire of claim 7 wherein the width of said center rib is within the range of approximately 20 to 40% of the width of the inflated tire.

16. The bicycle tire of claim 8 wherein the width of said center rib is within the range of approximately 20 to 40% of the width of the inflated tire.

17. In a bicycle tire, an improved tread design comprising:
   an annular bicycle tire carcass;
   an annular, raised center rib extending concentrically about said carcass defining a continuous annular center portion, and opposite side portions each provided with transversely disaligned, outwardly opening grooves, each groove having a bottom planar surface parallel to the circumferential extent of the rib, a first planar side surface extending perpendicularly to said circumferential extent of the rib, and an opposite, second planar side surface extending at an angle to the circumferential extent of the rib, the lands between said grooves on opposite side portions of said center rib defining parallel annuli interrupted by said grooves and extending parallel to said annular midportions; and
   tread portions outwardly of said rib.

18. The bicycle tire of claim 17 wherein the disposition of said perpendicular, first side surface relative to the angled, second side surface in one side of the rib is the reverse thereof in the opposite side of the rib.

19. The bicycle tire of claim 17 wherein the dimensional ratio of the height of said center rib to the height of raised blocks forming the tread portions located outwardly of said rib is equal to or greater than 1.0, and the relationship of the width of said center rib, the depth of said grooves, the width of the outer end of the grooves, and the width of the inner end of the grooves is $(\frac{1}{4})W_2 < w < (\frac{1}{2})W_21$, $(\frac{2}{3})w < a < 2w$ and $b/a = 1.1$ to $2.0$ wherein $W_2$ is the width of the rib, w is the depth of the grooves, a is the width of the grooves at the inner end thereof, and b is the width of the grooves at the outer end thereof, the width of said center rib being within a range of approximately 20 to 40% of the width of the inflated tire.

20. The bicycle tire of claim 17 wherein the disposition of said perpendicular, first side surface relative to the angled, second side surface in one side of the rib is the reverse thereof in the opposite side of the rib, and said angled side surfaces are aligned transversely of the tire.

21. The bicycle tire of claim 17 wherein the disposition of said perpendicular, first side surface relative to the angled, second side surface in one side of the rib is the reverse thereof in the opposite side of the rib, and said perpendicular side surface of the grooves in one side of the rib are aligned with the circumferential center of lands between the grooves of the opposite side of the rib.

* * * * *